Patented Oct. 20, 1925.

1,558,160

UNITED STATES PATENT OFFICE.

CLYDE M. GEARHART, OF WASHINGTON, DISTRICT OF COLUMBIA.

GUM-MASSAGE PREPARATION.

No Drawing.    Application filed April 4, 1925. Serial No. 20,863.

*To all whom it may concern:*

Be it known that I, CLYDE M. GEARHART, a citizen of the United States, residing at Washington, in the District of Columbia, have invented certain new and useful Improvements in Gum-Massage Preparations, of which the following is a specification.

This invention relates to a massage preparation, preferably in the form of a cream or paste, which has proven of great value in treating the gingiva or gum region of the mouth.

The object of the invention is to produce a massaging preparation which will cleanse, stimulate, and invigorate the soft tissues and place them in a generally healthy condition.

A further object is to prepare a dental preparation which through certain physical properties inherent in its composition, removes the mucous film, bacterial placques, etc., that form on the gums, and which increases the circulation of blood in the gums, so that they may more successfully resist disease.

This gum massaging preparation is of primary importance to wearers of artificial dentures, as removable plates or bridgework, wherein all or a portion of the gum or gingiva region is in contact with such devices. When these plates or bridges are worn it is very necessary to invigorate the gums to keep up the blood circulation therein so that the tissues remain firm and healthy and do not become soft or flabby, in which condition diseases more easily set in. If the gums are regularly massaged with my massage cream they will be stimulated and invigorated by the increase in blood circulation generated in the gingiva tissues.

It is universally acknowledged that failure to maintain health in the mouth often results in serious consequences.

With this thought in mind, I have conducted a long series of experiments to ascertain what might be done toward keeping the gums in a healthful condition. I have discovered that such a condition may be maintained by massaging them with a preparation which I have invented.

The preferred embodiment of my invention consists in making up a massage cream or paste consisting of sulfur, alum, water, starch and glycerine, together with a small amount of flavoring material such as an aromatic oil.

A very satisfactory gum massage preparation is made up of the following:

Water 15%, alum 5%, starch 15%, sulfur 25%, glycerine 39%, aromatic oil 1%.

The proportions of the ingredients used above, while entirely satisfactory, are not the only proportions wherein my new massage cream or paste may be expected to give the desired results, but are merely stated as an example of the proportions of a preparation of my gum massage compound which I have used with excellent results.

In use, my massage cream or paste is not applied by means of a brush, as are dentifrices, instead, the gums are thoroughly rubbed and manipulated with my massage cream or paste by the fingers, the treatment employed being similar to that used by masseurs. A designated amount of my preparation is placed on the index finger and distributed over the gums or other affected regions, such tissues being then vigorously massaged by the fingers to remove the mucous film and to produce stimulation. As a result of this mechanical stimulus, brought about largely by means of the rubefacient properties of my compound, which stimulates without irritation, fresh blood is brought to the flabby tissues, with a resultant increase in tone, and increased resistance to infection.

My experiments, which have covered a considerable period of time, during which many ingredients have been used and discarded, have demonstrated to my satisfaction that the benefits derived from my massage preparation are not obtainable from other ingredients other than those employed herein.

The sulphur contained in my compound acts largely as a massage agent. Its action is not that of the usual abrasives contained in dentrifices designed to cleanse the teeth, but as a paste or cream concerned largely with the production of a reaction in the mucous tissues of the oral cavity. Preferably, the sulfur employed in flowers of sulfur (U. S. P.), washed sulfur (U. S. P.), precipitated sulfur (U. S. P.) or other finely divided or powdered forms of the element.

An astringent, such as alum, is used as its action is to harden and strengthen the tissues of the gums.

Starch and glycerine, in the form of a glycerite, are incorporated for their effectiveness in removing the mucous, gelatinous and such other films which attach themselves to the gums and palate. The glycerine is also a convenient lubricating fluid vehicle for the other ingredients of the preparation so that a smooth, bland, homogeneous paste or cream is obtained when the ingredients are compounded. A small amount of flavoring material, such as an aromatic oil, is generally added to the cream to impart a pleasant and refreshing taste thereto.

What I claim as new, and desire to cover by United States Letters Patent is:—

1. A gum massage cream or paste preparation, containing sulfur and an astringent.

2. A gum massage cream or paste including in its composition finely divided sulfur and alum.

3. A gum massage cream or paste consisting of sulfur, an astringent, a carbohydrate, a liquid vehicle and an aromatic oil.

4. A gum massage cream or paste consisting of sulfur, alum, water starch, glycerine and a flavoring material.

5. A gum massage preparation consisting of 25% sulfur, 5% alum, 15% water, 39% glycerine, 15% starch and 1% aromatic oil.

6. A gum masasge cream or paste containing sulfur lotum as its characteristic ingredient.

In testimony whereof I affix my signature.

CLYDE M. GEARHART.